United States Patent [19]

Leroy et al.

[11] Patent Number: 4,627,955
[45] Date of Patent: Dec. 9, 1986

[54] PROCESS FOR DETECTING THE VARIATIONS IN THE REACTIVITY OF THE CORE OF A PRESSURIZED WATER NUCLEAR REACTOR AND DEVICE FOR MAKING USE OF THIS PROCESS

[75] Inventors: Jean Leroy, Gif-Sur-Yvette; Pierre Ruiz, Blanc Mesnil, both of France

[73] Assignee: Framatome & Cie., Courbevoie, France

[21] Appl. No.: 607,474

[22] Filed: May 7, 1984

[30] Foreign Application Priority Data

May 19, 1983 [FR] France ................... 83 08275

[51] Int. Cl.$^4$ .............................................. G21C 7/36
[52] U.S. Cl. ...................... 376/216; 376/215; 376/217; 376/219
[58] Field of Search ............... 376/216, 215, 217, 219

[56] References Cited

U.S. PATENT DOCUMENTS 4,075,059  2/1978  Bruno ................... 376/217

Primary Examiner—Donald P. Walsh
Attorney, Agent, or Firm—Pollock, Vande Sande & Priddy

[57] ABSTRACT

Process and device for the detection of the variations, due to a fault in the position of the core control clusters, in the reactivity of the core of a reactor. A momentary value (6) representing the reactivity calculated directly from the core neutron power (2) is compared to a momentary value (30) representing the reactivity calculated from the momentary mean temperature (25) in the core and the mean boron concentration (29) in the primary fluid passing through the core. The invention applies to pressurized water nuclear reactors.

5 Claims, 1 Drawing Figure

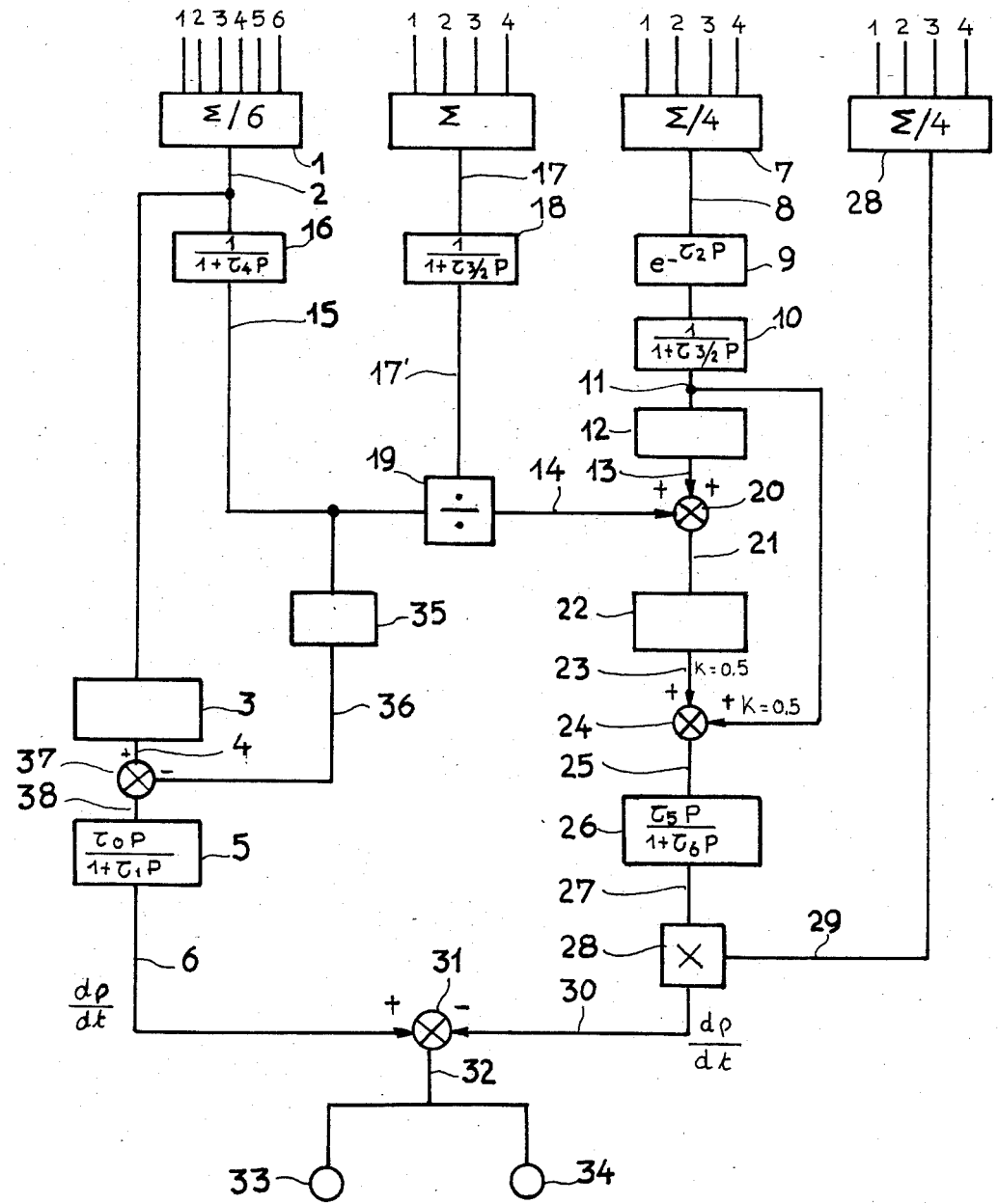

PROCESS FOR DETECTING THE VARIATIONS IN THE REACTIVITY OF THE CORE OF A PRESSURIZED WATER NUCLEAR REACTOR AND DEVICE FOR MAKING USE OF THIS PROCESS

BACKGROUND OF THE INVENTION

The detection of the variations in the reactivity of the core of a pressurized water nuclear reactor forms one of the means for controlling the correct operation of the reactor.

It is known to detect the variations in the reactivity of the fuel of a reactor from the reactor power, this power, which can be measured, for example, with the aid of flux chambers which are external to the core, being a function of the reactivity of the fuel.

However, when using such processes, it is not possible to distinguish the reactivity variations induced by the changes in the mean temperature of the primary fluid in the core from the reactivity variations due to a defective location of the control clusters, for example an untimely fall of clusters. Now, it is highly important to know the reactivity variations attributable to the clusters, since these variations are frequently very considerable and require prompt intervention by the supervising staff. Moreover, if it is desired to be able to act as promptly as possible, the reactivity variations must be detected very rapidly, even in a transient period.

SUMMARY OF THE INVENTION

The invention relates therefore to a process for detecting the variations, due to a fault in the position of the core control clusters, in the reactivity of the core of a pressurized water nuclear reactor having one or more cooling loops.

According to the invention, a momentary value representing the fuel reactivity calculated directly from the core neutron power measured by means of neutron flux measuring chambers outside the core is compared to a momentary value representing the reactivity calculated from the momentary mean temperature in the core and the mean boron concentration in the primary fluid passing through the core.

In a preferred embodiment, the value of the reactivity calculated directly from the neutron power of the core is obtained by solving the neutron kinetics equations relating the neutron power to the reactivity, and by correcting the value obtained from the said solution, by a coefficient which takes into account the influence of the DOPPLER effect.

Preferably, the mean temperature of the primary fluid in the core is calculated from the mean temperature, for the whole system of cooling loops, of the primary fluid at the entry of the core, and of the mean temperature of the primary fluid at the exit from the core, the latter being calculated by means of the thermal power of the core, the overall throughput of the primary fluid and of the mean temperature of the primary fluid measured at the entry to the core.

The invention also relates to a device for making use of the abovementioned process.

According to the invention, this device comprises:

means for measuring the neutron power of the core, the mean temperature of the primary fluid in the cold branch and the boron concentration in the primary fluid for the whole of the cooling loops, and of the overall throughput of the primary fluid, means for calculating the reactivity from the measurement of neutron power, comprising means for solving the neutron kinetics equations and for correcting the value thus obtained by a coefficient taking account of the DOPPLER effect, means for calculating the signal of mean temperature of the primary fluid at the entry to the core, obtained from the signal of mean temperature of the primary fluid in the cold branch, modified by an operator of the time lag corresponding to the mean transit time of a molecule of primary fluid from the point of temperature measurement in the cold branch to the entry of the core and by a point model of heat transfer of the primary fluid in the core, corresponding to the transit time of a molecule of primary fluid from the entry of the core to the center of the core, means for calculating the signal of the enthalpy at the entry of the core, from the signal of mean temperature of the primary fluid at the entry of the core, means for calculating the thermal power of the core from the measured neutron power, by means of a point model of heat transfer between the neutron flux and the heat flux of the primary fluid, means for calculating the signal of the enthalpy rise in the core, from the quotient of the signal of the thermal power of the core and the signal of the overall throughput of the primary fluid, modified by a point model of heat transfer of the primary fluid in the core, corresponding to one half of the mean transit time of a molecule of primary fluid for passing through the core, means for calculating the signal of the enthalpy at the exit of the core, by summation of the signal of the enthalpy at the entry of the core and of the signal of the enthalpy rise in the core, means for calculating the signal of the mean temperature, for the whole of the cooling loops, at the exit of the core from the signal of the enthalpy at the exit of the core, means for calculating the signal of the mean temperature of the primary fluid in the core from the signals of temperature at the entry and at the exit of the core, means for calculating a signal representing the reactivity in the core, from the signal of the mean temperature in the core and from a signal representing the boron concentration in the primary fluid, and means for comparing the signal representing the reactivity, obtained from the neutron power, to the signal representing the reactivity, obtained from the mean temperature in the core and from the boron concentration in the primary fluid.

In a preferred embodiment, the signals representing the reactivity consist of the time derivatives of the reactivity.

BRIEF DESCRIPTION OF THE DRAWING

In order that the invention may be more clearly understood, it will now be described in greater detail with more particular reference to a preferred embodiment of the invention, illustrated by the attached drawing.

DETAILED DESCRIPTION OF AN EMBODIMENT

The single FIGURE shows that four parameters relating to the operation of the core are measured and that the variations of reactivity which are due to the clusters are deduced therefrom, by means of a device described below.

The measurements are, first of all, neutron flux measurements carried out in a conventional manner by means of four multi-level neutron flux chambers arranged outside the core, each chamber measuring the neutron flux originating from one of the quadrants of the core. In the example to be described, four devices according to the invention are employed, one device being associated with each of the multi-level chambers. This permits the control of the reactivity even if one of the four devices is found to be defective or is being repaired. (A symmetrical power distribution is assumed.)

An adder 1 makes it possible to obtain, from the neutron flux measurement signals produced in the various levels (for example, six in number) of the chamber, a signal representing the mean neutron power of the core, which will subsequently be referred to more simply as the neutron power signal 2.

This signal 2 enters a unit 3 which calculates the reactivity of the core, the neutron power being a function of this reactivity. It is preferable to employ a simple relationship between the neutron power and the reactivity, taking into account, for example, a single average group of neutrons which are retarded in the course of the chain reaction taking place in the reactor. The inventor has found that, by making this simplification, he obtained a highly satisfactory result, i.e., that the device according to the invention, while employing a simplified relationship between the neutron power and the reactivity, made it possible to obtain the objective aimed at by the invention, namely, accurate and fast detection of the variations in the reactivity in order to be able to intervene in time to correct these variations.

The signal 2 also makes it possible to calculate the thermal power of the core, indicated by 15, by means of a point model 16 of heat transfer between the neutron flux and the heat flux of the primary fluid. The transfer function of the model 16 is $$\frac{s}{s + \tau_4 p},$$

$\tau_4$ representing the time constant of heat transfer and $p$ the Laplace variable.

The thermal power signal 15 enters a unit 35 giving a signal 36 which is subtracted, in an adder 37, from the signal 4 of the overall reactivity produced by the unit 3. The signal 36 is a signal for correcting the reactivity, taking account of the influence of the DOPPLER effect.

The signal 38 obtained at the output of the adder 4 enters a unit 5 which calculates the derivative $dp/dt$ of the signal 38. This signal will be denoted by 6. It will be observed that the transfer function of the unit 5, $$\frac{\tau_0 p}{s + \tau_1 p},$$

comprises, besides the factor $\tau_p$ where $\tau_c$ is the derivative constant of the reactivity, a filter $$\frac{s}{s + \tau_1 p}$$

of a conventional type, in order to obtain a signal 6 involving as little interference as possible ($p$ is of course the Laplace variable).

While the signal 6 constitutes a signal developed from the neutron flux of the reactor, another signal representing the reactivity of the reactor will be developed as a function of the mean temperature of the primary fluid in the core. To this end, a unit 7 determines the mean of the temperatures measured in the cold branches of each of the cooling loops, in this case four. The signal produced by this unit is denoted by 8. Since the sensors of the cold branch temperature are placed some distance from the entry of the core, and not exactly at the entry of the core, the signal 8 is modified by an operator 9 (transfer function $e^{-\tau_2 p}$) of time lag corresponding to the mean transit time $\tau_2$ of a molecule of primary fluid from the temperature measurement point in the cold branch to the entry of the core. This operator 9 is followed by a point model 10 of heat transfer of the primary fluid in the core corresponding to the transit time ($\tau_3 r/2$ of a molecule of primary fluid from the entry of the core to the center of the core $$\left(\text{transfer function: } \frac{s}{s + \frac{\tau_3}{2} p}\right).$$

At the output of this model 10 a signal 11 is obtained corresponding to the mean temperature $\theta e$, for the whole of the loops, at the entry of the core. The signal 11 is then entered into an operator 12 which calculates the value of the mean enthalpy at the entry of the core. The enthalpy is determined, for example, by a second degree polynomial in $\theta e$. For greater accuracy, it is also possible to do the calculation according to a third degree polynomial in $\theta e$. A signal 13 is thus obtained, representing the mean enthalpy at the entry of the core.

Furthermore, means are provided for calculating the rise in enthalpy of the primary fluid during the crossing of the core. This signal, which will be denoted by 14, is obtained as a quotient of the signal 15 of the thermal power of the core and the signal of overall throughput of the primary fluid. The signal of overall throughput of the primary fluid is obtained by summation of the throughput of the primary fluid for the whole of the cooling loops of the reactor, in this case four, the overall throughput signal 17 being modified by a point model 18

$$\left(\text{transfer function: } \frac{s}{s + \frac{\tau_3}{2} p}\right)$$

of heat transfer of the primary fluid in the core corresponding to one half of the mean transit time $\tau_3$ of a molecule of primary fluid for passing through the core. The overall throughput signal modified by the model 18 will be denoted by 17'. The signals 15, 17', 11 and 13 are in phase.

The operator 19 produces the ratio of the signal 17' to the signal 15: a signal 14 is obtained, representing the rise in mean enthalpy of the primary fluid in the core.

The signals 13 and 14 are then added in an adder 20, enabling a signal 21 to be obtained representing the mean enthalpy at the exit of the core. An operator 22 deduces from the signal 21 a signal 23 representing the mean temperature at the core exit. The operator 22 naturally employs the same relationship between the enthalpy and the temperature as the abovementioned operator 12, the exit temperature corresponding to the positive root, in the case of a second degree polynomial.

The signals 11 and 23 representing the mean temperature of the primary fluid at the entry and at the exit of the core are entered into an adder 24 after each of them has been allocated a coefficient K equal to one half. The signal 25 produced by the adder 24 represents the mean temperature of the primary fluid in the core.

An operator 26, having a transfer function $$\frac{\tau_5 p}{s + \tau_6 p}$$

(p being the Laplace variable), calculates, starting from the signal 25, a signal 27 representing the time derivative of the mean temperature of the primary fluid in the core. $\tau_5$ represents the derivative constant and $\tau_6$ a filter for reducing the transient gain of the operator 26.

An operator 28 produces, furthermore, the mean of the measurements of boron concentration in the primary fluid for the whole of the cooling loops of the reactor. The signal produced by the operator 28 is denoted by 29. Since the reactivity of the reactor is a function of the mean temperature in the core and of the boron concentration, an operator 28 receiving at its input the signals 27 and 29 permits a signal 30 to be obtained representing the derivative (dp/dt) of the reactivity in the core.

The signals 6 and 30 are compared at 31. When the reactor operates normally, the two signals cancel each other and the signal 32 produced by the comparator 31 is zero, but, if the signal 32 reaches a certain value, it represents an anomaly residing in the control clusters, for example an uncontrolled fall of clusters. The signal 32 enters two threshold relays 33 and 34, the relay 33 detecting the positive signals 32 and the relay 34 detecting the negative signals 32. It is thus possible to know the direction of the reactivity variation due to the clusters and to intervene in a different manner according to whether this variation is positive or negative: a positive variation may require an emergency stoppage, which, of course, is not necessary in the case of a negative variation.

In the example described, two values of the time derivative of the reactivity have been compared, but it would also be possible to compare directly two values of the reactivity, eliminating in a conventional manner the continuous component of the signals representing these values.

It would also be possible to replace the point models 10 and 17 by other point models performing the same function; these could, for example, be non-linear.

It would also be possible to measure directly the mean temperature of the primary fluid in the core despite the technical constraints which this necessitates.

In every case, the possible alternative forms must be made such that all the signals are in phase and that the device is thereby applicable not only in continuous operation but also in transient operation; this is the case with the device described by way of example, which enables a highly effective control of the anomalies due to the clusters.

We claim:

1. Process for detecting the variations, due to a fault in the position of the core control clusters, in the reactivity of the core of a pressurized water nuclear reactor having at least one cooling loop, comprising the steps of
   (a) measuring the core neutron power by means of neutron flux measuring chambers outside said core;
   (b) calculating from said measured core neutron power an instantaneous value of the reactivity of said reactor;
   (c) measuring the mean temperature in said core;
   (d) measuring the mean boron concentration in the primary fluid passing through said core,
   (e) calculating from said measured mean temperature and mean boron concentration a second instantaneous value representing the reactivity of said reactor; and
   (f) comparing said first instantaneous value of the reactivity to the second instantaneous value of said reactivity for detecting a fault in the position of the core control clusters, in the case where said values of reactivity are different.

2. Device for detecting the variations, due to a fault in the position of the core control clusters, in the reactivity of the core of a pressurized water nuclear reactor having at least one cooling loop, comprising
   (a) means for measuring the neutron power of the core, the mean temperature of the primary fluid in the cold branch and the boron concentration in the primary fluid for the whole of the cooling loops and of the overall through-put of the primary fluid;
   (b) means (3) for calculating the reactivity from the measurement (2) of the neutron power, comprising means (3) for solving the neutron kinetics equations and for correcting (37) the value (4) thus obtained by a coefficient (36) taking account of the DOPPLER effect;
   (c) means (12) for calculating the signal (11) of means temperature of the primary fluid at the entry to the core, obtained from the signal of mean temperature (8) of the primary fluid in the cold branch, modified by an operator (9) of the time lag corresponding to the mean transit time of a molecule of primary fluid from the point of temperature measurement in the cold branch to the entry of the core and by a point model (10) of the heat transfer of the primary fluid in the core, corresponding to the transit time ($\tau_3/2$) of a molecule of primary fluid from the entry of the core to the center of the core;
   (d) means for calculating the signal (13) of the enthalpy at the entry of the core from the signal (11) of mean temperature of the primary fluid at the entry of the core;
   (e) means for calculating the thermal power (15) of the core from the measured neutron power (2), by means of a point model (16) of heat transfer between the neutron flux and the heat flux of the primary fluid;
   (f) means for calculating (19) the signal (14) of the enthalpy rise in the core, from the quotient of the signal of the thermal power (15) of the core and the signal (17) of the overall throughout of primary fluid, modified by a point model (18) of the heat transfer of the primary fluid in the core, corresponding to one half of the mean transit time of a molecule of primary fluid for passing through the core;
   (g) means for calculating (22) the signal of the enthalpy (23) at the exit of the core, by summation of the signal (13) of the enthalpy at the entry of the core and of the signal (14) of the enthalpy rise in the core;

(h) means for calculating the signal (25) of the mean temperature, for the whole of the cooling loops, at the exit of the core, from the signal (23) of the enthalpy at the exit of the core;

(i) means for calculating the signal (25) of the mean temperature of the primary fluid in the core from the signals (11, 25) of temperature at the entry and at the exit of the core;

(j) means for calculating (28) a signal (30) representing the reactivity in the core, from the signal (25) of the mean temperature in the core and from a signal (29) representing the boron concentration of the primary fluid; and (k) means for comparing the signal (6) representing the reactivity, obtained from the neutron power (2), to the signal (30) representing the reactivity, from the mean temperature (25) in the core and from the boron concentration (29) in the primary fluid.

3. The process as claimed in claim 1, wherein the value (6) of the reactivity calculated directly from the neutron power of the core (2) is obtained by solving the neutron kinetics equations relating the neutron power to the reactivity, and by correcting the value (4) obtained from the said solution by a coefficient (36) which takes into an account of the influence of the DOPPLER effect.

4. The process as claimed in claim 1, wherein the mean temperature (25) of the primary fluid in the core is calculated from the mean temperature (8), for the whole system of cooling loops, of the primary fluid at the entry of the core, and of the mean temperature (23) of the primary fluid at the exit from the core, the latter being calculated by means of the thermal power (15) of the core, of the overall throughput of the primary fluid (17) and of the mean temperature of the primary fluid at the entry to the core (8).

5. The device as claimed in claim 2, wherein the signals representing the reactivity consist of the time derivatives of the reactivity.

* * * * *